E. F. SLATTERY.
REPAIR LINK FOR TIRE CHAINS.
APPLICATION FILED APR. 2, 1917.
1,438,560.
Patented Dec. 12, 1922.
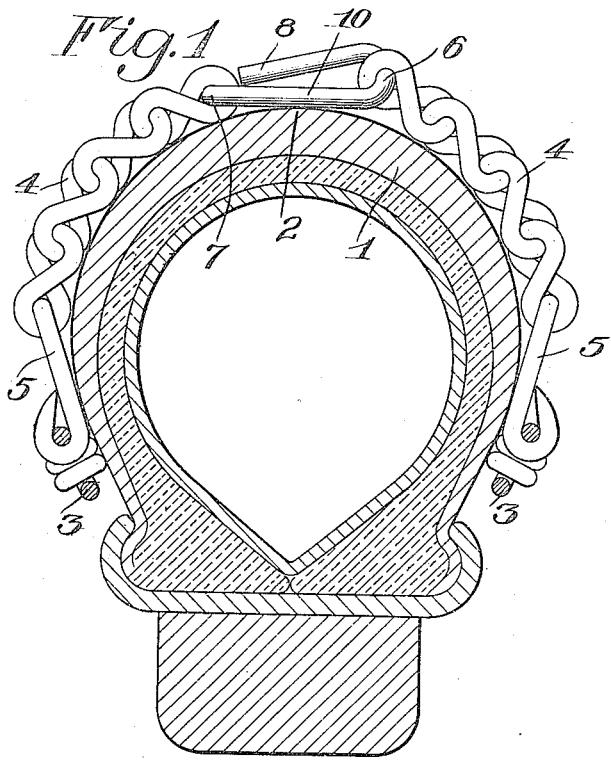
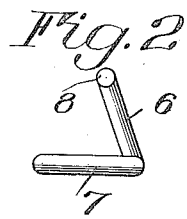
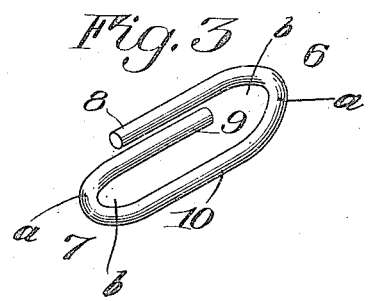
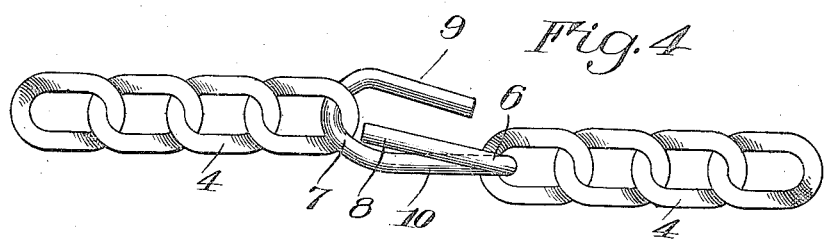
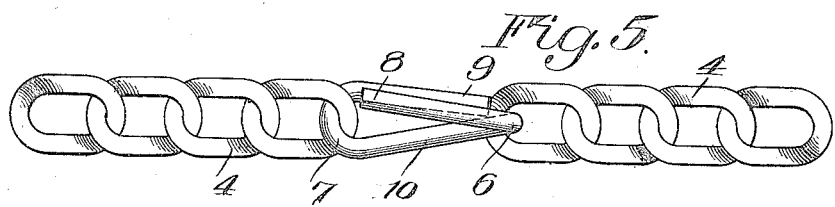
WITNESSES:
Nelson H. Copp
INVENTOR
Edward F. Slattery
BY
his ATTORNEYS Patented Dec. 12, 1922.

1,438,560

UNITED STATES PATENT OFFICE.

EDWARD F. SLATTERY, OF ROCHESTER, NEW YORK.

REPAIR LINK FOR TIRE CHAINS.

Application filed April 2, 1917. Serial No. 159,295.

*To all whom it may concern:*

Be it known that I, EDWARD F. SLATTERY, a citizen of the United States, and resident of Rochester, in the county of Monroe and State of New York, have invented certain new and useful Improvements in Repair Links for Tire Chains; and I do hereby declare the following to be a full, clear, and exact description of the same, reference being had to the accompanying drawings, forming a part of this specification, and to the reference numerals marked thereon.

My invention relates to anti-skid tire chains and it has for its object to provide a simple and efficient repair link of a nature enabling it to be used with convenience and despatch in temporarily reuniting the loose ends of a cross chain the link of which has worn through and become broken. To these and other ends the invention resides in certain improvements and combinations of parts all as will be hereinafter more fully described, the novel features being pointed out in the claims at the end of the specification.

In the drawings:

Figure 1 is a sectional view taken transversely through a vehicle tire and its side chains showing in side elevation a cross chain fitted with a repair link constructed in accordance with and illustrating one embodiment of my invention;

Figure 2 is an end view of the repair link before its application to the chain;

Figure 3 is a perspective view thereof;

Figure 4 is a detail plan view showing the manner in which the repair link is applied to the chain, and Figure 5 is a view similar to Figure 4 showing the manner in which the repair link is fastened in place.

Similar reference numerals throughout the several views indicate the same parts.

The construction and mode of operation of the tire chain in general use at the present time is thought to be so well known as not to require description here. In Figure 1, 1 indicates the tire, 2 the tread thereof, 3 the side chains disposed circularly at the sides of the tire with a circumference less than that of the tire at the tread, 4 the cross chain links, and 5 the connections between the side chains and the cross chain. When the chain is in its original form, the cross links 4 extend continuously across the tire and the link that lies directly upon the tread 2 at the point of tangency to the ground is necessarily the one which receives the hardest wear and which is the first to be worn so thin as to break. Of course, the others are worn proportionately as they lie at a greater or less distance from the tread. When a break occurs at any point, the fit of the chain is disturbed and if several of the cross chains become broken, it becomes so destroyed as to make the chain liable to come off altogether and become lost. Aside from this, the noise and wear of the loose ends of the cross chain striking against the mud guards is objectionable. It is not always convenient or possible to replace the cross chain as a whole, tools being required to open the connections 5 of the old chain and to close those of the new.

In the practice of my invention, I therefore provide a repair link for rejoining the broken ends of the cross chain which may be quickly put in place without the use of tools. It is made from a single piece of round wire stock bent into two oppositely turned loops 6 and 7. For convenience of reference and to make clear the terminology of the appended claims, I may here explain in connection with Figure 3 in particular that the following terms are to be given these meanings: by "loop" I refer to the two doubled portions 9—a—10 and 8—a—10; by "bend" I refer to the curved intermediate portions "a" of the loops, and by "eye" I refer to the openings "b" enclosed by the bends "a" of the loops which latter are indicated only generally by the reference numerals 6 and 7. The "plane" of a loop, loop 7 for instance, I consider to be the plane common to 9—a—b—10.

The loops 6 and 7 each have a relatively wide opening (including the eyes b) of uniform width by disposing the free end portions 8 and 9 parallel with each other and to the common intermediate or body portion 10.

The loops are disposed so that one lies in a plane transverse to or intersecting the plane of the other and they preferably lie not quite at right angles to each other so that the free end portion 8 or 9 of the material forming one loop comes substantially opposite the eye b in the other from which it is spaced, as shown in Figures 2 and 4. Thus one loop when lying against a supporting surface provides a non-tilting base upon which the free end portion of the other loop can be bent downwardly to close that loop.

The cross chains 4 are composed of twisted links so formed that each loop or eye of each link as it lies in a natural position against the tire opens in a direction laterally of the longitudinal extent of the cross chain and parallel with the tire surface, as shown in Figure 1, and also in a direction relatively transverse to the first mentioned direction and normal to that surface. This enables the repair link to be applied in the manner shown in Figure 4 with the loop 7 flat against the tire and passed through one cross link and the loop 6 at an angle to and standing out from the tire and passed through the end link of the other piece of the cross chain. With the repair link in this position, the user may press his foot against the free end 8 of the outstanding loop 6 and press it down until it closes against the loop 7 as shown in Figure 4, usually at or near the center of the eye thereof, the loop 7, as before described, providing a non-tilting support for the operation. The cross chain is then twisted through 90° and the same action taken with respect to the free end 9 of the loop 7, with the result that when the cross chain reassumes its normal position flat against the tire, both loops of the repair link will be secured in closed positions, as shown in Figure 5. Thereafter, the loop 7 will lie flat against the tire surface so as not to injure it and the wheel will ride upon the loop 6, preventing the free end 8 from opening. The two loops of the repair link are sufficiently wide and have such a gradual bend that they but loosely engage the cross chain links allowing the latter sufficient freedom of movement so that there can be no binding action resulting in undue strains and wear. In other words, with the repair link added, the cross chain can still adapt itself to a natural position close against the tire.

The link will be found to be particularly convenient in an emergency for a quick repair and where, the chain and wheel being covered with mud or ice, it would be an unpleasant undertaking to attempt the more involved operation of substituting a whole new cross chain.

I claim as my invention:

1. A repair link for the cross chains of vehicle tires composed of wire rod bent into two open loops but with its ends parallel to each other, the loops being arranged in intersecting planes, the free end portion of the wire of one loop being disposed opposite the eye of the other loop but spaced therefrom so that the latter forms a non-tiltable base against which said end may be bent into locking position, one of said loops being adapted to lie against the surface of a tire and the bends of both being adapted to furnish free sliding engagement with cross chain links through which they may be passed.

2. The combination with a chain embodying twisted links the loops of which, when laid upon a surface, each open in a direction normal to that surface and also in a direction parallel therewith, of a repair link composed of wire stock bent into two loops arranged in intersecting planes, the free end portion of the wire of one loop being disposed opposite the eye of the other loop, the bend of one loop being passed loosely in the said parallel direction through a link of the chain to lie against the said surface and the bend of the other loop being passed loosely in the said normal direction through another link of the chain and to lie in a plane substantially normal to the surface so that pressure applied to said surface through said last mentioned loop will tend to close the loop.

EDWARD F. SLATTERY.

Witnesses:
RUSSELL G. GRIFFITH,
AGNES NESBITT BISSELL.